Jan. 12, 1943.  N. J. KOOK ET AL  2,307,798

SAND SPREADER FOR VEHICLES

Filed May 19, 1939

Inventors
Nicholas J. Kook,
Beatrice F. Kook,
Attorney

Patented Jan. 12, 1943

2,307,798

UNITED STATES PATENT OFFICE 2,307,798

SAND SPREADER FOR VEHICLES

Nicholas J. Kook and Beatrice F. Kook, Detroit, Mich.

Application May 19, 1939, Serial No. 275,686

2 Claims. (Cl. 291—25)

This invention relates to a new and useful improvement in sand spreaders for vehicles whereby sand or some other gritty substance is spread in front of the wheels of a vehicle to prevent it from skidding on slippery pavements and to improve the traction of the wheels.

It is an object of this invention to provide a convenient receptacle for storing chemically treated sand and to keep the sand warm while being stored so that it will, when desired, flow freely to the pavement and not become frozen when wet.

Another object of this invention is to spread sand in a relatively wide path in front of the wheels of the vehicle to which it is attached so that when the vehicle is turning or if it is skidding sideways the wheels will come in contact with sand.

A further object of this invention is to provide a tank for compressed air, the compressed air being injected into the system to blow the sand in a path in front of the wheels of the vehicle in the most efficient manner.

Another object of this invention is to introduce sand and compressed air into the system either simultaneously or with the air being introduced a short interval of time after the sand, and further to provide valves and controls to automatically effectuate the latter sequence of operation.

Other and further objects and advantages will become hereinafter more fully apparent by reference to the accompanying drawing wherein the invention is illustrated by way of example in which—

Figure 1 is a diagrammatic illustration of an automobile having the invention installed thereon, this view being in plan;

Fig. 2 is a side elevation of the same;

Fig. 3 is a front elevation of the receptacle for storing the sand and the valves controlling the introduction of sand and air into the system being partially in section;

Fig. 4 is a side elevation of the same being partially in section;

Fig. 5 shows a jet for introducing compressed air into the system, being partially in section;

Fig. 6 is a modified view showing valves for introducing sand and air into the system and controls for the same.

The reference numeral 7 indicates an automobile upon which the present device is installed. However, it should be understood that the invention may be used in conjunction with any desired type of vehicle, such as a bus, train, streetcar, or airplane. To a convenient part of the vehicle is attached a receptacle 8 by means of brackets 9, but preferably the receptacle is installed directly under the hood in front of the dash 10 and over the engine so that the heat of the engine will keep the sand 11 in the receptacle warm and prevent frozen lumps from being formed therein if the sand should happen to become damp. The receptacle 8 has slanting sides 12 so that the sand will flow out freely when desired. It is also provided with a filler opening 13 for pouring sand into the receptacle and a cover 14 which is moisture tight and prevents sand from running out. A screen 15 within the filler opening 13 prevents large lumps from passing into the receptacle and as this screen may be firmly attached it also prevents tampering with the contents of the receptacle. The receptacle may also be provided with a sightglass 16 so that the quantity of sand in the receptacle may be readily observed.

The lower portion of the sides of the receptacle 8 has a funnel-like extremity 17 which constricts the passage of sand therethrough. A ring 18 is also attached about the exterior of the funnel-like extremity 17. This ring fits into the upper end 19 of the chamber 20 in a manner to form a seal. The lower portion 21 of the chamber 20 is lined with rubber 22 or other similar substance. Within this portion is a valve 23 of a butterfly type, which when in closed position fits tightly against the rubber 22. The lower portion of the chamber 20 has a diameter considerably larger than the diameter of the spout 24 of the funnel 17. There is also a storage space 25 of considerable volume within the chamber 20 and above the valve 23. When the valve 23 is opened the sand in the storage space 25 passes rapidly out of the chamber. If for any reason the valve 23 should be held in open position the sand will not run out of the receptacle as rapidly as otherwise, and hence there is more time for the operator to close the valve before an excessive amount of sand runs out. After the valve is closed the storage space 25 of the chamber is filled up by the flow of the sand by gravity from the receptacle 8. After passing through the valve 23 the sand divides into two equal parts of the Y 26.

A tank of compressed air 27 is placed at some convenient position on the vehicle such as at the rear as shown in the drawing. The tank may be filled at a service station and for convenient filling a line 28 is run through the side of the vehicle and projects out from the side. A check valve 29 in the line prevents air from leaking back. A gage 30 is located on the dash 10 and connected by a line 31 with the tank so that the operator may know how much pressure remains in the tank. The compressed air may be used for a number of auxiliary purposes. As shown, a flexible hose 32 is connected to the tank and may be used for emergency inflation of tires. A valve 33 is installed to prevent air from leaking out through the hose when it is not in use.

Compressed air is conveyed through the line 34 to jets 35 within each branch of the Y 26. A valve 36 is installed in the line 34 to control the flow of air therethrough. The air blows the sand out through the pipes 37. The nozzles 38 at the lower ends of the pipes have a flaring configuration which spreads the sand in a path in front of the rear wheels of the vehicle several times the width of the tires. Thus when the vehicle is skidding or turning the wheels are sure to come in contact with sand, which would not be the case if a straight nozzle were used. Plates 39 are placed ahead of the nozzles 38 so that water, snow or slush thrown from the front wheels will not collect around the nozzles and tend to clog them. The pipes 37 have a generally downward sweeping curve so that sand will not stick in them. They may be made of rubber hose if desired so that vibration of the car will cause the hose to vibrate, thus assisting the flow of sand.

It has been found desirable in the use of this device that the sand valve 23 be released shortly before the air valve 36 is opened so that the air will get behind the sand and blow it out through the nozzles forcefully. One advantage of this sequence of operations is that, if the sand has passed the air jets 35 in its path through the pipes 37, then the sand will not be blown backward toward the receptacle 8. This permits a more rapid discharge and a greater volume of discharge. Another advantage of this sequence is that, if the air is not discharging when the first quantity of sand passes the jets 35, then the tendency of the air to create turbulence in the sand is obviated and hence the sand is discharged in the desired path before the wheels of the vehicle rather than being blown out of the nozzles 38 indiscriminately. The sequence of operations results in a more rapid discharge of a greater quantity of sand in the desired location. The air directs the sand downward to the pavement directly in front of the rear wheels but in a wide enough path so that the wheels will come in contact with sand even when turning or skidding. It should be noted that the jets 35 may be constricted so that air will flow through them at very high speed. In Fig. 2 independent handles 40 and 41 on the dash 10 are provided for the air and sand valves respectively and are connected thereto by control rods 42 and 43 respectively, and the operator by proper manipulation may cause the sand and then the air to enter the system. However, in Fig. 6, a modified form is shown where this sequence is performed automatically. The control rod 42a for the air valve passes inside the sleeve 44 attached to the control rod 43a. The sleeve 44 has a flange 45 and the rod 42a has a button 46 as shown in the drawing. The operator pulls the flange 45, which causes the sand valve 23 to open, and as he continues to pull the flange it strikes the button 46, thus opening the air valve 36. In either installation, springs 47 and 48 are attached to the control rods 42 and 43 respectively to return the valves 36 and 23 to closed position when the handles 40 and 41 or the flange 45 and button 46 are released.

What we claim is:

1. In a sand spreader for a vehicle having a receptacle for storing sand and a conduit for conveying the sand to a point in front of the wheels of the vehicle, a sand control device therebetween comprising, a constricted opening at the lower end of the receptacle for storing sand, a storage chamber below said constricted opening, a throat below said storage chamber, the interior diameter of said throat being considerably greater than the interior diameter of said constricted opening at the lower end of the receptacle for storing sand, and a valve within said throat, the interior diameter of said throat being smaller than the interior diameter of said storage chamber, and the cross sectional area of said constricted opening being considerably less than the cross sectional area of any other passage between the receptacle and the wheels of the vehicle.

2. In a sand spreader for a vehicle having a receptacle for storing sand and a conduit for conveying the sand to a point in advance of the wheels of a vehicle, a control device therebetween comprising, a constricted opening at the lower end of the receptacle for storing sand, a storage chamber below said constricted opening, a throat below said storage chamber, the interior diameter of said throat being considerably greater than the interior diameter of said constricted opening at the lower end of the receptacle for storing sand, the interior diameter of said throat being smaller than the interior diameter of said storage chamber, a valve within said throat, and auxiliary means for discharging sand from said storage chamber, and the cross sectional area of said constricted opening being considerably less than the cross sectional area of any other passage between the receptacle and the wheels of the vehicle.

NICHOLAS J. KOOK.
BEATRICE F. KOOK.